(12) United States Patent
Nakano

(10) Patent No.: US 7,235,620 B2
(45) Date of Patent: *Jun. 26, 2007

(54) POLYESTER HAVING π-CONJUGATED GROUP IN SIDE CHAIN AND CHARGE TRANSPORTING MATERIAL USING THE SAME

(75) Inventor: Tamaki Nakano, Nara (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/513,659

(22) PCT Filed: May 7, 2003

(86) PCT No.: PCT/JP03/05727

§ 371 (c)(1),
(2), (4) Date: Nov. 8, 2004

(87) PCT Pub. No.: WO03/095519

PCT Pub. Date: Nov. 20, 2003

(65) Prior Publication Data

US 2005/0228163 A1  Oct. 13, 2005

(30) Foreign Application Priority Data

May 8, 2002 (JP) .............................. 2002-132598

(51) Int. Cl.
C08G 63/02 (2006.01)

(52) U.S. Cl. ...................................... 528/272; 525/437

(58) Field of Classification Search ................ 528/271, 528/403, 408, 425, 437; 525/437
See application file for complete search history.

(56) References Cited

U.S. PATENT DOCUMENTS 3,505,268 A  4/1970 Backhouse et al.
5,225,522 A  7/1993 Turner et al.
2004/0132963 A1* 7/2004 Nakano ...................... 528/425

FOREIGN PATENT DOCUMENTS

| CH | 515 740 A | 11/1971 |
|----|-----------|---------|
| EP | 0 443 542 A | 8/1991 |
| EP | 0 583 609 A | 2/1994 |
| FR | 1 590 574 A | 4/1970 |
| JP | 2002-80734 | 3/2002 |

* cited by examiner

Primary Examiner—Terressa Boykin
(74) Attorney, Agent, or Firm—Millen, White, Zelano & Branigan, P.C.

(57) ABSTRACT

A polyester expressed by the following structural formula 1, and a charge transport material obtained by adding an electron acceptor compound or an electron donor compound to this polyester.

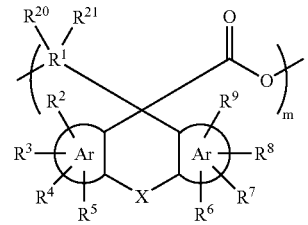

In the aforesaid structural formula, Ar is an aromatic group and this aromatic group may contain a heterocyclic ring.

$R^1$ is a carbon atom or absent (direct bond), $R^2$–$R^9$ are hydrogen atoms, electron donor groups or electron attracting groups, $R^{20}$, $R^{21}$ are hydrogen atoms or organic groups, X is a hetero atom, hetero atom-containing group, organic group or absent (direct bond), and m is an integer equal to 2 or more.

18 Claims, No Drawings

POLYESTER HAVING π-CONJUGATED GROUP IN SIDE CHAIN AND CHARGE TRANSPORTING MATERIAL USING THE SAME

FIELD OF THE INVENTION

This invention relates to a novel polymer compound having a fluorene residue in a side chain. In particular, it relates to a novel polymer compound which can form a charge transfer complex with an electron acceptor compound or an electron donor compound, and a charge transfer complex formed by addition of the electron acceptor compound or electron donor compound.

BACKGROUND OF THE INVENTION

As described in Tokkai 2000-319366, a polyester with a fluorene residue is already known. This polyester has excellent heat-resistance and transparency, high refractive index, low birefringence and low water absorptivity, and is therefore suitable as an optical instrument material. However, as there was almost no overlap of fluorene residues, it was difficult to make it express electrical characteristics using the properties of π-conjugated electrons.

It is also known that by adding an electron acceptor compound or an electron donor compound to a polymer material with a π-conjugated group such as polyacethylene or polyfluorene, a material exhibiting charge transport qualities will be obtained. However, as such a material is degraded by water or oxygen, there was a problem as to its stability as a material exhibiting charge transport qualities.

SUMMARY OF THE INVENTION

The inventor made a detailed study of polymer compounds having special electrical qualities due to the properties of π-conjugated electrons. As a result, it was discovered that a polyester having a fluorene residue in a side chain had unique electrical qualities, and forms a charge transfer complex of excellent stability with a suitable electron acceptor compound or electron donor compound, which led to the present invention.

It is therefore a first object of this invention to provide a polyester having π-conjugated electrons, that is a polyester having unique electrical qualities due to the properties of π-conjugated electrons.

It is a second object of this invention to provide a composition which forms a stable charge transfer complex with an electron acceptor compound or an electron donor compound.

The aforesaid objects of this invention are attained by a polyester expressed by the following structural formula 1.

In the formula, m is an integer equal to 2 or more.

Structural Formula 1

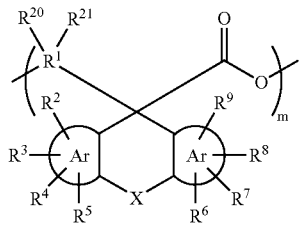

In addition, in the aforesaid structural formula, Ar is an aromatic group and this aromatic group may contain a heterocyclic ring.

$R^1$ is a carbon atom or absent (direct bond), $R^2$–$R^9$ are hydrogen atoms, electron donor groups or electron attracting groups, $R^{20}$, $R^{21}$ are hydrogen atoms or organic groups, and X is a hetero atom, hetero atom-containing group, organic group or absent (direct bond).

In this invention, it is preferred that $R^1$ is absent, i.e., that it is the end of a polymerizing unit.

DETAILED DESCRIPTION OF THE INVENTION

The hetero atom X in the structural formula 1 is —O—, —NR— or —S—. The organic group is preferably —(CH$_2$)— or an aromatic group.

The electron donor group in the aforesaid structural formula 1 of this invention is a functional group which, due to the introduction of a substituent, has an increased electron density in the fluorene residue and enhanced electron donor properties in the fluorene residue. This electron donor group may for example be —F, —Cl, —Br, —I, —OH, —OR, —O(C=O)R, —NR$^{10}$R$^{11}$, —SR, —SH or an alkyl group, but among these, —C$_6$H$_{11}$, -t-C$_4$H$_9$ and —NR$^{10}$R$^{11}$ are preferred. R, R$^{10}$ and R$^{11}$ may be H or an organic group, but preferably an aromatic group or an alkyl group. $R^{20}$, $R^{21}$ may be a hydrogen atom, alkyl group, aromatic group, —CN or ester group.

The electron attracting group is a functional group which, due to the introduction of a substituent, has a decreased electron density in the fluorene residue, and enhanced electron acceptor properties in the fluorene residue. This electron acceptor group may for example be —C≡N, —(C=O)R, —SO$_2$—, —NO$_2$, phenyl, —COOH or —COOR, but —C≡N and —NO$_2$ are preferred.

By introducing the aforesaid electron-attracting group and electron donor group into the polymer, a more stable charge-transfer complex is obtained when an electron donor compound and electron acceptor compound, described later, are added.

Preferred combinations of $R^2$–$R^9$ are:
(1) all of $R^2$–$R^9$ are H;
(2) $R^3$, $R^8$ are NR$^{10}$R$^{11}$ (R$^{10}$, R$^{11}$ are respectively H, an alkyl group or an aromatic group), and $R^2$, $R^4$–$R^7$, $R^9$ are H;
(3) $R^3$, $R^8$ are NH$_2$, and $R^2$, $R^4$–$R^7$, $R^9$ are H;
(4) $R^3$, $R^8$ are —N(C$_6$H$_5$)$_2$, and $R^2$, $R^4$–$R^7$, $R^9$ are H;
(5) $R^3$, $R^8$, $R^6$ are NO$_2$, and $R^2$, $R^4$, $R^5$, $R^7$, $R^9$ are H;
(6) $R^3$, $R^8$ are NO$_2$, and $R^2$, $R^4$–$R^7$, $R^9$ are H;
(7) $R^3$, $R^8$, $R^6$ are CN, and $R^2$, $R^4$, $R^5$, $R^7$, $R^9$ are H;
(8) $R^3$, $R^8$ are CN, $R^2$, $R^4$–$R^7$, $R^9$ are H.

The electron acceptor compound described above is a compound having a stronger electron affinity than the polymer of structural formula 1. Examples are the following halogens, Lewis acids, proton acids and transition metal halogens etc. Halogens: I$_2$, Br$_2$, Cl$_2$, ICl, ICl$_3$, IBr, IF Lewis acids: BF$_3$, PF$_5$, AsF$_5$, SbF$_5$, SO$_3$, BBr$_5$, BF$_4^-$, PF$_6^-$, AsF$_6^-$, SbF$_6^-$, ClO$_4^-$ Proton acids: HNO$_3$, H$_2$SO$_4$, HClO$_4$, HF, HCl, FSO$_3$H, CFSO$_3$H Transition metal halides: FeCl$_3$, MoCl$_5$, WCl$_5$, SnCl$_4$, MoF$_5$, FeOCl, RuF$_5$, TaBr$_5$, SnI$_4$, LnCl$_3$ (Ln is La, Ce, Pr, Nd or Sm).

Others: (9-fluorenylidene)acetonitrile,
(9-fluorenylidene)malononitrile,
(2,4,7-trinitro-9-fluorenylidene)acetonitrile,
(2,4,7-trinitro-9-fluorenylidene)malononitrile, o-dinitrobenzene, m-dinitrobenzene, p-dinitrobenzene, 2,4,7-trinitrobenzene, 2,4,7-trinitrotoluene, TCNQ, TCNE, DDQ.

On the other hand, the electron donor compound is a compound having a smaller ionization potential than the polymer of structural formula 1. Examples are hexamethylbenzene, alkali metals, ammonium ion and lanthanoids.

When an electron-attracting functional group is introduced into a fluorene residue, an electron donor compound is preferably added, and when an electron donor functional group is introduced into a fluorene residue, an electron acceptor compound is preferably added. A stable charge-transfer type complex is thus obtained.

(Synthesis Method)

To synthesize the polymer of this invention, for example, the following compounds may be polycondensed using the usual catalyst.

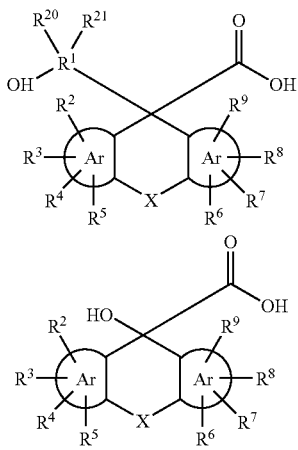

$R^1$–$R^9$, and $R^{20}$, $R^{21}$ are respectively identical to $R^1$–$R^9$, and $R^{20}$, $R^{21}$ in structural formula 1.

The molecular weight of the polymer is preferably 400–1 million but more preferably 800–100,000 in terms of number average molecular weight. If it is less than 400, it is rare for an electron acceptor compound or electron donor compound to enter between fluorene residues, and if it is more than 1 million, the solubility decreases.

The distance between fluorene residues is 4–20 Å, but preferably 5–10 Å. If it is less than 4 Å, the electron acceptor compound or electron donor compound cannot enter between fluorene residues. If it is more than 20 Å, the electron acceptor compound or electron donor compound which entered between fluorene residues cannot easily form an electron donor-acceptor complex.

Tg of the polymer is preferably 30–300° C., but more preferably 80–200° C. When Tg is less than 30° C., formation of the electron donor-acceptor complex is blocked by structural change of the polymer due to temperature change.

If the aforesaid conditions are satisfied, a stable electron donor-acceptor complex can be obtained. Such a stable electron donor-acceptor complex is suitable as a charge transport material, for example as a hole transport layer of an organic EL or a solar cell. Such a charge transport material can be easily manufactured by a known method, such as spin coating.

EXAMPLES

Hereafter, this invention will be described in further detail referring to examples, but this invention is not to be construed as being limited in any way thereby.

Example 1

Polymer Synthesis

Synthesis of 9-hydroxymethyl-9-fluorene carboxylic acid (monomer)

9-fluorene carboxylic acid (4.98 g, 23.7 mmol) and anhydrous THF (300 ml) were introduced into a flame-dried reaction vessel in which the atmosphere had been replaced by nitrogen, the reaction solution was cooled to −78° C., and n-butyl lithium (41.0 ml of 1.6M hexane solution, 71.0 mmol) was added. After stirring the reaction solution at −78° C. for 30 minutes, paraformaldehyde (2.30 g, 75.0 mmol) dissolved in anhydrous THF (100 ml) was added at −78° C., and stirred at room temperature for 13 hours. Distilled water was added, the solution was extracted with ether, and the pH of the aqueous layer was adjusted to 2 using 1N hydrochloric acid. It was then extracted again with chloroform, and the organic layer was dried by anhydrous magnesium sulfate. The low-boiling fraction was distilled under reduced pressure with the rotary evaporator, and 4.21 g of crude product was thus obtained. The methylene chloride-insoluble fraction of this crude product was collected, and the target compound (4.60 g, 19.3 mmol, 80.5%) was thus obtained. $^1$H-NMR (500 MHz, CDCl$_3$) d: 7.78 (d, J=7.5, 2H), 7.67 (d, J=7.5, 2H), 7.46 (dd, J=7.0, 2H), 7.54 (dd, J=8.0, 2H), 4.02(s, 4H).

Synthesis of polymer using 9-hydroxymethyl-9-fluorene carboxylic acid as starting material 9-hydroxymethyl-9-fluorene carboxylic acid (50.4 mg, 0.21 mmol) and 0.9 mg of a catalyst (CF$_3$SO$_3$)$_2$Sn were introduced into a reaction vessel (9 mm Φ×50 mm), and the mixture was shaken to render it uniform. Subsequently, it was heated at 180° C. for 3 hours while blowing in nitrogen (a syringe needle was fixed over about 2 mm of compound). After 3 hours, the obtained compound was separated by decantation into a THF soluble part (47.1 mg) and a THF-insoluble part (2.20 mg). The dried and weighed THF-soluble part was re-dissolved in THF (3 ml), diazomethane (ether solution, 1 ml) was slowly dripped in with stirring, and stirred at room temperature for 5 hours. After 5 hours, the solvent and volatile component were distilled off with the rotary evaporator, the obtained crude product was divided into a methanol-soluble part (8.10 mg) and methanol-insoluble part (34.9 mg), and the methanol-insoluble part was divided into a THF-soluble part (14.19 mg) and a THF-insoluble part (20.64 mg). The part which was insoluble in methanol but soluble in THF had a molecular weight distribution of approx. 1,000 to 10$^5$ (SEC, polystyrene conversion).

Example 2

Polymer Synthesis

Anhydrous methylene chloride (17 ml) was added to 9-hydroxy-9-fluorene carboxylic acid (1.01 g, 4.42 mmol) in a flame-dried reaction vessel in which the atmosphere had been replaced by nitrogen, and stirred at room temperature for 5 minutes to give a uniform solution. Anhydrous triethylamine (0.62 ml, 4.502 mmol) was then dripped in. The reaction solution was stirred at room temperature for 30 minutes, and an anhydrous methylene chloride (3 ml) solution of p-tosyl chloride (762 mg, 4.42 mmol) was dripped in. The reaction solution was stirred at room temperature for 15 hours and extracted with chloroform, and the organic layer was dried by anhydrous magnesium sulfate. The solvent was distilled off under reduced pressure with the rotary evaporator, and the obtained crude product was classified into a hexane-soluble part (111 mg) and a hexane-insoluble part (777 mg). The hexane-insoluble part was dissolved in THF (20 ml), diazomethane (ether solution, 3 ml) was gradually dripped in with stirring, and the solution stirred at room temperature for 5 hours. The reaction product was a mixture of polymers consisting of 2–10 monomers. This polymer mixture was classified by recycling liquid chromatography, and the pure dimer, trimer and tetramer were thus obtained.

Example 3

D-A Complexing, Spectrometry

Formation of D-A complex from poly(9-hydroxymethyl-9-fluorene carboxylic acid) and m-dinitrobenzene (DNB)

1. Absorption Spectrum Measurement in Solution

The polymer (2.98 mg) and DNB (1.80 mg, 0.01 mmol) were dissolved in THF for ultraviolet absorption spectra to give 10 ml of solution. This was diluted 100 times, and used for absorption spectrum measurements (quartz cell; 10 mm) at room temperature. The absorption intensity of the polymer and DNB mixture was smaller than the absorption intensity of the polymer alone. The intensity which was 0.140 at 242 nm changed to 0.108 after adding DNB. This change depended on the concentration, and when the DNB concentration was changed to $2.5 \times 10^{-5}$ M and $5.0 \times 10^{-5}$ M, the absorption intensity at 242 nm changed to 0.077 and 0.059, respectively. This hypochromic effect proved that the fluorene ring of the polymer and DNB formed a stacked complex.

The absorption at long wavelength extended from 310 nm to 345 nm.

2. D-A Complexing in Solid State

The polymer (100 mg) and m-nitrobenzene (100 mg) were taken up as a $CH_2Cl_2$ solution, and the light red solid produced while distilling off the solvent was collected. When this was again dissolved in $CH_2Cl_2$ and the solvent was distilled off, thin red acicular crystals were obtained.

Example 4

Formation of D-A complex using poly(9-hydroxy-9-fluorene carboxylic acid) and 2,4,7-trinitrol-9-fluorenylidene malononitrile (TNFMN)

1. Absorption Spectrum Measurement in Solution

TNFMN (363.3 mg, 1.0 mmol) was dissolved in methylene chloride solvent for ultraviolet absorption spectra to give 100 ml of solution. Next, a polymer (10.4 mg of a mixture of polymer consisting of 2–10 monomers, 0.05 mmol in monomer units) was dissolved using this solution. The absorption spectrum was measured at room temperature on 1 ml of solution (quartz cell; 0.1 mm). As a result of this measurement, new peaks due to a D-A complex, 386 nm ($\lambda_{max}$=0.038) and 488 nm ($\lambda_{max}$=0.009), were observed.

2. D-A Complexing in Solid State

TNFMN (15.1 mg, 0.04 mmol) and a polymer (10.4 mg, 0.05 mmol in monomer units) were put into methylene chloride solution, and the solvent was distilled off to dryness to give an orange-red solid. A composition analysis by $^1$HNMR of this solid showed that the proportion of monomer units:TNFMN was 1:1.

Example 5

D-A complexing using trimer of 9-hydroxy-9-fluorene carboxylic acid and TNFMN

1. Absorption Spectrum Measurement in Solution

TNFMN (363.3 mg, 11.0 mmol) was dissolved in methylene chloride solvent for ultraviolet absorption spectra to give 100 ml of solution. Next, the trimer (10.4 mg, 0.05 mmol in monomer units) was dissolved using this solution, and the absorption spectrum was measured at room temperature on 1 ml of solution (quartz cell; 0.1 mm). As a result, new peaks due to the D-A complex, 388 nm ($\lambda_{max}$=0.037) and 489 nm ($\lambda_{max}$=0.009), were observed. These absorption intensities depended on concentration, and when the concentration of fluorene was changed to 0.03M and 0.04M, the absorption intensity at 388 nm changed to 0.022 and 0.029, respectively.

2. D-A Complexing in Solid State

TNFMN (15.1 mg, 0.04 mmol) and a trimer (10.4 mg, 0.05 mmol in monomer units) were put into methylene chloride solution, and the solvent was distilled off to dryness to give an orange solid. A composition analysis by $^1$HNMR of this solid showed the proportion of monomer units: TNFMN was 1:1.

Example 6

Conductivity: Time of Flight Measurement

A mixture having a polymerization degree of approx. 20 (principal components are dimer-tetramer) was taken in $CH_2Cl_2$ solution, 1% 2,4,7-trinitrofluorene malononitrile was added to this, and dissolved. The solution was then spread on an ITO glass substrate, and dried to produce a thin film (1 µm thickness). Aluminum was deposited on the obtained film (thickness 1000 Å, area 5 mm×5 mm). A voltage of 5.0V was applied between the ITO and aluminum using TOF301 (Optel, Inc.), a 337 nm pulse laser (nitrogen laser, pulse width, 1 ns, 150 µJ) was simultaneously irradiated from the ITO side, and the time of flight was measured. From the test results at room temperature, the hole mobility was determined as $1.20 \times 10^{-4}$ $cm^2V^{-1}sec^{-1}$.

INDUSTRIAL APPLICATION

The polyester of this invention has a fluorene residue in a side chain, and it can form a charge transfer complex having excellent stability with an electron acceptor compound or electron donor compound. It is therefore suitable as a charge transport material such as an organic EL material, or the hole transport layer of a solar cell.

What is claimed is:

1. A polyester having π-conjugated electrons of the following structural formula 1:

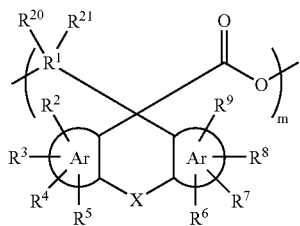

wherein,
$R^1$ is a carbon atom or $R^1$ is absent thereby providing a direct bond, in which case $R^{20}$ and $R^{21}$ are not present,
$R^2$–$R^9$ are independently hydrogen atoms, electron donor groups or electron attracting groups,
m is an integer equal to 2 or more, Ar is an aromatic group including an aromatic group having a heterocyclic ring, $R^{20}$, $R^{21}$ are, independently, hydrogen atoms, alkyl groups, aromatic groups, —CN or ester groups, and
X is —O—; —NR— where R is a hydrogen atom, alkyl group or aromatic group; —S—; —CH$_2$—; or absent resulting in a direct bond.

2. The polyester according to claim 1, wherein the molecular weight of said polyester is from 400 to one million in terms of number average molecular weight.

3. The polyester according to claim 2, wherein the distance between the polycyclic groups in adjacent units in said polyester is 4–20 angstroms.

4. The polyester according to claim 1, wherein Tg of said polyester is 30–300° C.

5. A composition obtained by adding an electron acceptor compound or an electron donor compound to the polyester according to claim 1.

6. The composition according to claim 5, wherein said composition forms a charge transfer complex.

7. A charge transport material formed using the composition according to claim 6.

8. The polyester of claim 1, wherein each Ar is phenyl and X is —CH$_2$—.

9. The polyester of claim 1, wherein $R^1$ is absent thereby providing a direct bond, in which case $R^{20}$ and $R^{21}$ are not present.

10. The polyester of claim 1, wherein $R^2$–$R^9$ are independently hydrogen atoms, electron donor groups selected from F, Cl, Br, I, —OH, —OR, —O(C=O)R, —NR$^{10}$R$^{11}$, —SR, —SH or an alkyl group, or electron attracting groups selected from —CN, —(C=O)R, —SO$_2$, —NO$_2$, phenyl, —COOH or —COOR, where R, $R^{10}$, and $R^{11}$ are each independently a hydrogen atom, alkyl group or aromatic group.

11. The polyester of claim 10, wherein $R^2$–$R^9$ are selected from one of the following combinations:
all H,
$R^3$ and $R^8$ are —NR$^{10}$R$^{11}$, and $R^2$, $R^4$–$R^7$, and $R^9$ are H,
$R^3$ $R^8$ are —H$_2$, and $R^2$, $R^4$–$R^7$, and $R^9$ are H,
$R^3$ and $R^8$ are —N(phenyl)$_2$, and $R^2$, $R^4$–$R^7$, and $R^9$ are H,
$R^3$, $R^6$ and $R^8$ are —NO$_2$, and $R^2$, $R^4$, $R^5$, $R^7$, and $R^9$ are H,
$R^3$ and $R^8$ are —NO$_2$, and $R^2$, $R^4$–$R^7$, and $R^9$ are H,
$R^3$, $R^6$ and $R^8$ are —CN, and $R^2$, $R^4$, $R^5$, $R^7$, and $R^9$ are H, or
$R^3$ and $R^8$ are —CN, and $R^2$, $R^4$–$R^7$, and $R^9$ are H.

12. The composition of claim 5, wherein the composition comprises an electron acceptor compound selected from halogen compounds, Lewis acid compounds, proton acid compounds, transition metal halides or (9-fluorenylidene)acetonitrile, (9-fluorenylidene)malononitrile, (2,4,7-trinitro-9-fluorenylidene)acetonitrile, (2,4,7-trinitro-9-fluorenylidene)malononitrile, o-dinitrobenzene, m-dinitrobenzene, p-dinitrobenzene, 2,4,6-trinitrobenzene, 2,4,6-trinitrotoluene, tetracyanoquinodimethane (TCNQ), tetracyanoethylene (TCNE) or 2,3-dichloro-5,6-dicyano-p-benzoquinone (DDQ).

13. The composition of claim 5, wherein the composition comprises an electron donor compound selected from hexamethylbenzene, an alkali metal compound, an ammonium ion compound or a lanthanoid compound.

14. The polyester of claim 1, wherein the molecular weight of said polyester is from 800 to 100,000 in terms of number average molecular weight.

15. The polyester of claim 1, wherein the Tg of said polyester is from 80–200° C.

16. The charge transport material of claim 7, wherein the material is in the form of a hole transport layer of an organic electroluminescent (EL) device or solar cell.

17. The polyester of claim 1, which is a polyester of 9-hydroxy-9-fluorene carboxylic acid.

18. The polyester of claim 1, wherein each Ar ring is phenyl.

* * * * *

UNITED STATES PATENT AND TRADEMARK OFFICE
CERTIFICATE OF CORRECTION

PATENT NO. : 7,235,620 B2
APPLICATION NO. : 10/513659
DATED : June 26, 2007
INVENTOR(S) : Tamaki Nakano It is certified that error appears in the above-identified patent and that said Letters Patent is hereby corrected as shown below:

Column 7, line 21, insert a hard line break after "2 or more,"

Column 7, line 22, insert a hard line break after "heterocyclic ring,"

Column 8, line 11, reads "$R^3R^8$ are $-H_2$," should read -- $R^3$ and $R^8$ are $-NH_2$, --

Signed and Sealed this

Twenty-third Day of October, 2007

JON W. DUDAS
*Director of the United States Patent and Trademark Office*